(12) United States Patent
Ikegami

(10) Patent No.: US 6,363,307 B1
(45) Date of Patent: Mar. 26, 2002

(54) CONTROL SYSTEM FOR OCCUPANT PROTECTION APPARATUS

(75) Inventor: Kenji Ikegami, Fujisawa (JP)

(73) Assignee: Nissan Motor Co., Ltd., Kanagawa (JP)

(*) Notice: Subject to any disclaimer, the term of this patent is extended or adjusted under 35 U.S.C. 154(b) by 0 days.

(21) Appl. No.: 09/657,526

(22) Filed: Sep. 8, 2000

(30) Foreign Application Priority Data

Sep. 14, 1999 (JP) .......................................... 11-261006

(51) Int. Cl.$^7$ .............................................. G06F 19/00
(52) U.S. Cl. ............................ 701/45; 701/46; 280/735
(58) Field of Search ............................ 701/45, 46, 47; 280/735, 736, 728.1, 734, 742

(56) References Cited

U.S. PATENT DOCUMENTS

| | | | |
|---|---|---|---|
| 4,836,024 A | * 6/1989 | Woehrl et al. | ................. 73/514 |
| 5,083,276 A | * 1/1992 | Okano et al. | ................. 701/45 |
| 5,359,515 A | 10/1994 | Weller et al. | |
| 5,668,720 A | 9/1997 | Takahashi et al. | |
| 5,899,949 A | * 5/1999 | Kincaid | ................. 701/45 |
| 5,900,807 A | 5/1999 | Moriyama et al. | |
| 5,977,651 A | * 11/1999 | Ueda et al. | ................. 307/10.1 |
| 6,020,812 A | * 2/2000 | Thompson et al. | ......... 340/438 |
| 6,199,901 B1 | * 3/2001 | Iizuka | ................. 280/735 |

FOREIGN PATENT DOCUMENTS

EP        0 748 725 A     12/1996

* cited by examiner

Primary Examiner—Tan Nguyen
(74) Attorney, Agent, or Firm—Shinjyu Global IP Counselors, LLP

(57) ABSTRACT

A control system is provided for an occupant protection apparatus including one or more air bags. The control system is capable of avoiding an increase in manufacturing costs by minimizing the number of components and by utilizing a common circuit portion in a pair of activation circuits, while maintaining a rated current substantially equal to that of completely separate activation circuits. If a collision of a vehicle occurs, first and second activation circuits are activated based on an integrated value $\Delta V$ of a deceleration measured with the G-sensor. If an activation time period of the second activation circuit happens to overlap with an activation time period of the first activation circuit, a control unit activates the second activation circuit upon completion of the activation of the first activation circuit. Therefore, the number of components of the control system can be reduced. Also, since the first and second activation circuits are not activated at the same time, a portion of the activation circuits that is common to both of the first and second activation circuits can be inside of a circuit that has the same capacity as conventional circuits.

19 Claims, 10 Drawing Sheets

CONTROL SYSTEM FOR OCCUPANT PROTECTION APPARATUS

BACKGROUND OF THE INVENTION

1. Field of the Invention

This invention generally relates to a control system for an occupant protection apparatus. More specifically, the present invention relates to an occupant protection apparatus having one or more of air bags.

2. Background Information

There have been known various occupant protection apparatuses that utilize air bags for protecting vehicle occupants. Typically, the air bags are arranged at driver and/or passenger seats, and are activated based on a deceleration of a vehicle.

There has been known an occupant protection apparatus in which two or more air bags are arranged at a passenger seat, In such system, a proximity sensor is provided on a dashboard to detect a position of an occupant occupying the passenger seat. How the air bags should be activated at the time of a collision of the vehicle is determined based on the position of the occupant as detected by the proximity sensor. If a distance between the occupant and the dashboard is equal to or greater than a predetermined distance, the air bags are activated substantially simultaneously. On the other hand, if the distance between the occupant and the dashboard is less than the predetermined distance, the air bags are activated sequentially.

In this known occupant protection apparatus, additional spiral cables, harnesses, connectors and other components need to be provided in order to control the operation of the two or more air bags. To install an occupant protection apparatus on a driver seat side, it is generally desirable to store these components within a steering wheel. However, it is difficult to arrange a number of components within the steering wheel due to space limitation.

One possible way of addressing such disadvantage is to reduce the number of circuits in the apparatus by having squibs share one of their circuits, on either the positive side or the negative side. However in this arrangement, to activate both of the airbags at the same time, twice as much electrical current needs to be applied to the shared circuit. Therefore, the shared circuit needs to be upgraded to a higher-standard circuit, such that the shared circuit can handle twice as much electrical current passing through the circuit without breaking it. Consequently, use of such circuit leads to an increased manufacturing cost.

In view of the above, there exists a need for a control system for controlling an occupant protection apparatus which overcomes the above mentioned problems in the prior art. This invention addresses this need in the prior art as well as other needs, which will become apparent to those skilled in the art from this disclosure.

SUMMARY OF THE INVENTION

Accordingly, an object of the present invention is to provide a control system for an occupant protection apparatus that can minimize the number of components as well as avoid an increase in the manufacturing costs by utilizing a circuit of a conventional rating as a shared activation circuit for squibs.

The forgoing object of the present invention can be attained by providing a control system for an occupant protection apparatus of a vehicle comprising first and second activating devices adapted to activate the occupant protecting apparatus; a control unit operatively coupled to the first and second activating devices, the control unit including a collision diagnostic portion that determines a level of a collision of the vehicle based on deceleration of the vehicle during the collision; a deceleration sensor operatively coupled to the control unit to provide information on the deceleration of the vehicle during the collision; a first activation circuit operatively coupling the control unit to the first activating device; and a second activation circuit operatively coupling, the control unit to the second activating device, the first and second activation circuits share a commonly connected portion; the control unit activating the first activation circuit and the second activation circuit based on the level of the collision determined with the collision diagnostic portion such that if an activation time period of the second activation circuit happens to overlap with an activation time period of the first activation circuit, the control unit activates the second activation circuit after completion of activation of the first activation circuit.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Figure 1:
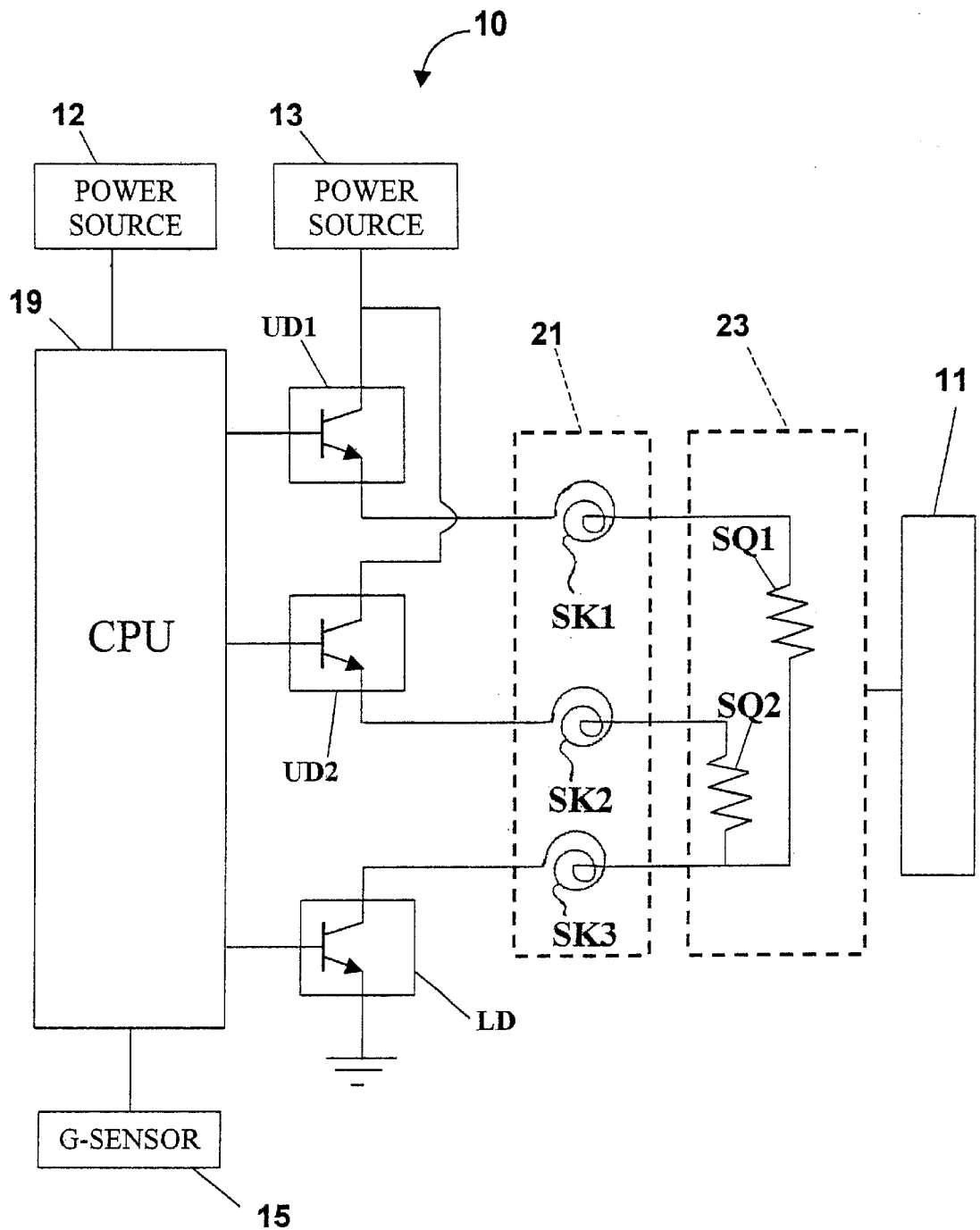
FIG. 1 is a schematic circuit diagram of a control system for an occupant protection apparatus in accordance with the first embodiment of the present invention in which the activation circuits of the squibs SQ1 and SQ2 share the lower driving circuit.
Figure 5:
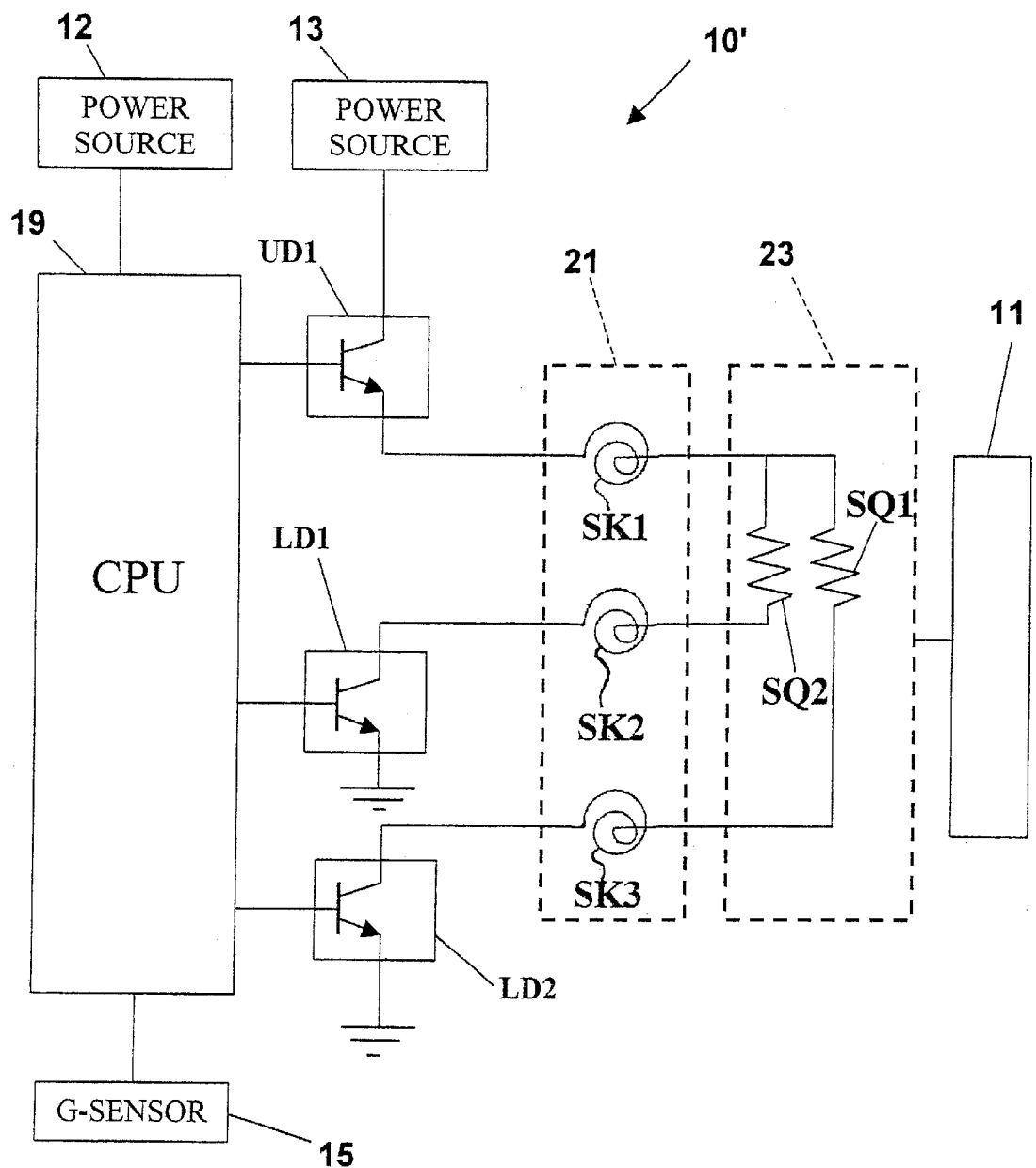
FIG. 5 is a schematic circuit diagram of a control system for an occupant protection apparatus in accordance with a second embodiment of the present invention, in which the activation circuits of the squibs SQ1 and SQ2 share the upper driving circuit.
Figure 10:
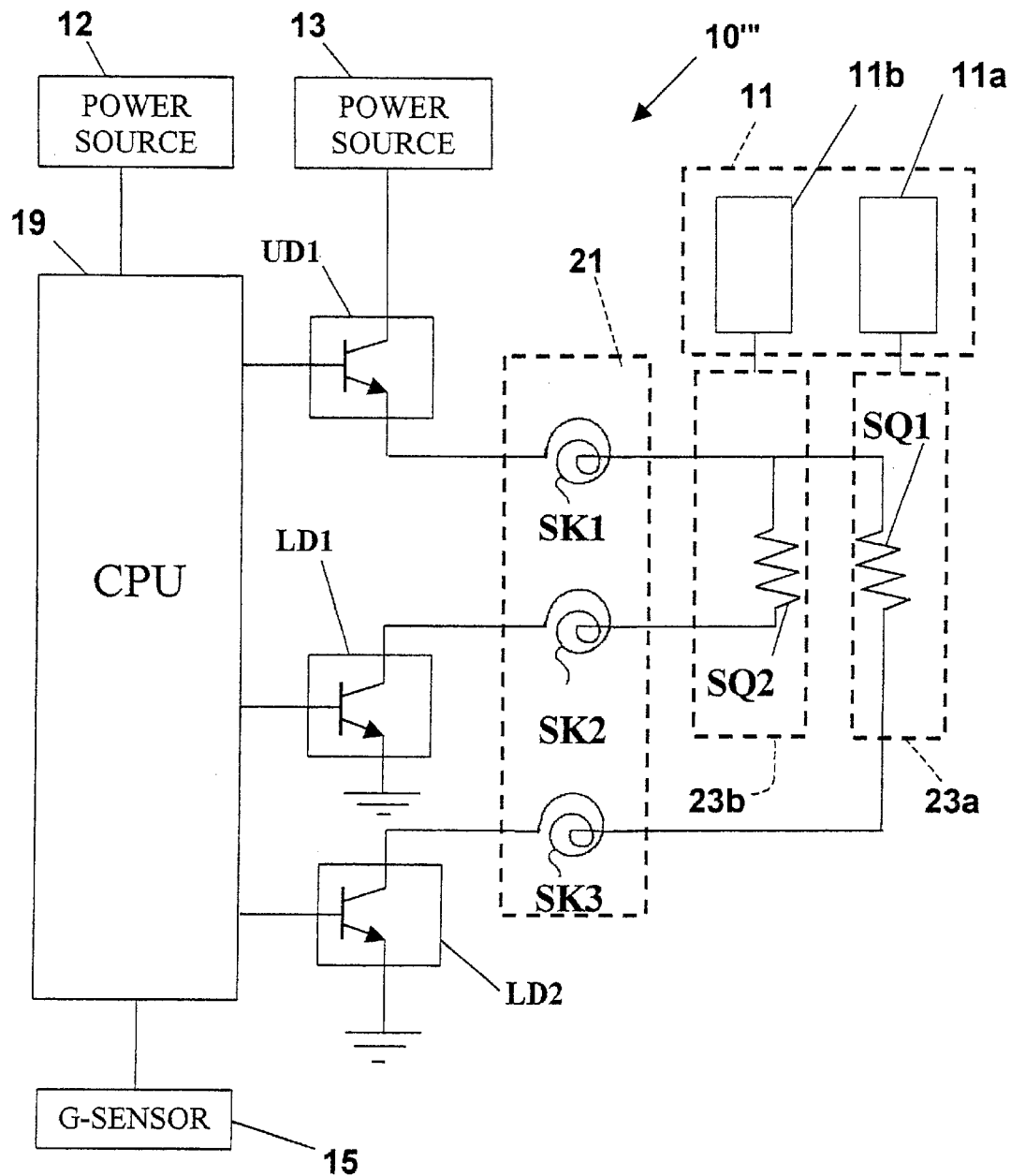
FIG. 10 is a schematic circuit diagram of a control system for an occupant protection apparatus in accordance with a fifth embodiment of the present invention, in which the activation circuits of the squibs SQ1 and SQ2 share the upper driving circuit.

Embodiments of the present invention will be described with reference to the drawings. FIG. 1 is a schematic circuit diagram of a control system 10 for an occupant protection apparatus 11 in accordance with the first embodiment of the present invention. In this embodiment, the control system 10 controls the activation of the occupant protection apparatus 11. The occupant protection apparatus 11 preferably includes one or more air bags. FIGS. 1 and 5 show occupant protection apparatus utilizing a single air bag, while FIGS. 10 and 11 illustrate a pair of air bags 11a and 11b forming occupant protection apparatus 11. When the occupant protection apparatus 11 has a single air bag, the control system 10 regulates the degree of inflation of the airbag. When the occupant protection apparatus 11 has two or more air bags, the control system 10 regulates the sequence of the air bags (see FIGS. 10 and 11). Of course, the degree of inflation of the airbags can be regulated in addition to the sequence of the air bags, if the occupant protection apparatus 11 has two or more air bags. In the first embodiment of FIG. 1, the occupant protection apparatus 11 is schematically illustrated as a single airbag.

As seen in FIG. 1, the control system 10 for an occupant protection apparatus 11 includes a pair of power sources 12 and 13, a vehicle deceleration sensor (G-sensor) 15, a control unit or central processing unit (CPU) 19, a first upper driving circuit UD1, a second upper driving circuit UD2, a lower driving circuit LD, a plurality of spiral cables 21, and a dual-stage inflator 23. The first upper driving circuit UD1 and the lower driving circuit LD form a first activation circuit for firing or activating a first squib SQ1 based upon a deployment control program executed by the control unit 19. The second upper driving circuit UD2 and the lower driving circuit LD form a second activation circuit for firing or activating a second squib SQ2 based upon the deployment control program executed by the control unit 19.

The power source 12 is operatively coupled to the control unit 19 for supplying power thereto, while the power source 13 is operatively coupled to the driving circuits UD1, UD2 and LD for supplying power thereto. The power sources 12 and 13 preferably electrical energy storage devices such as batteries that provide electrical current to the control unit 19 and the driving circuits UD1, UD2 and LD.

The spiral cables 21 and the dual-stage inflator 23 are conventional components that are well known in the art. Therefore, the spiral cables 21 and the dual-stage inflator 23 will not be discussed or illustrated in detail herein. Moreover, it will be apparent to those skilled in the art from this disclosure that the spiral cables 21 and the dual-stage inflator 23 can be any type of components that will carryout the present invention.

The G-sensor 15 measures deceleration of a vehicle and outputs to the control unit 19 a signal that indicates the magnitude of the deceleration of the vehicle. The G-sensor 15 is a conventional sensor that is well known in the art. Therefore, the G-sensor 15 will not be discussed or illustrated in detail herein. Moreover, it will be apparent to those skilled in the art from this disclosure that the G-sensor 15 can be any type of sensor that will detect and generate the necessary signal to carryout the present invention.

The control unit 19 preferably includes a microcomputer with a deployment control program that controls the deployment of the dual-stage inflator 23 as discussed below. The control unit 19 can also include other conventional components such as an input interface circuit, an output interface circuit, and storage devices such as a ROM (Read Only Memory) device and a RAM (Random Access Memory) device. The control unit 19 is operatively coupled to the power sources 12 and 13 and driving circuits UD1, UD2 and LD in a conventional manner. The internal RAM of the control unit 19 stores statuses of operational flags and various control data. The internal ROM of the control unit 19 stores the deployment control program and a timer for timing various operations. The control unit 19 is capable of selectively controlling any of the components of the control system 10 in accordance with the deployment control program.

In the control system 10 for the occupant protection apparatus 11 shown in FIG. 1, the squibs SQ1 and SQ2 share their downstream side of the activation circuits. In other words, the lower driving circuit LD forms a common connected portion of the activation circuits. Thus, the driving circuits UD1 and LD supply electrical current to the first squib SQ1 from the power source 13, while the driving circuits UD2 and LD supply electrical current to the second squib SQ2 from the power source 13.

Each of the driving circuits UD1, UD2 and LD includes a transistor, which is turned "ON" or "OFF" based on a control signal sent from the control unit 19 to supply and/or disconnect electrical current to squibs SQ1 and/or SQ2. When the driving circuits UD1, UD2 and LD are turned "ON", electrical current is supplied to a corresponding squib through the corresponding spiral cable 21.

For the sake of simplification, FIG. 1 only shows transistors in the driving circuits UD1, UD2 and LD. Of course, it will be apparent to those skilled in the art that the driving circuits UD1, UD2 and LD can include other conventional circuits and devices such as a constant current control device, which can be used for activating the corresponding squibs SQ1 and/or SQ2. Although not shown in figures, the constant current control devices are preferably provided at least in both of the upper driving circuits UD1 and UD2 to maintain a constant supply of current to the squibs SQ1 and SQ2.

The squibs SQ1 and SQ2 are arranged inside the dual-stage inflator 23. Each of the squibs SQ1 and SQ2 is energized with a predetermined current I (amperes) for a predetermined period of time T1 and T2 (msec) respectively, to ignite adjacent gas-generating propellant with heat energy generated by the energization. The combustion gas rapidly generated from the propellant inflates the air bag. In this invention, the manner of inflation of each air bag is adjusted by separating the activation timing of the squib SQ2 from that of the squib SQ1.

In order to activate all of the driving circuits UD1, UD2 and LD at about the same time, the lower driving circuit LD, which is the shared circuit, and the first upper driving circuit UD1 are first turned "ON" to energize the squib SQ1. Upon completion of the energization of the squib SQ1, the lower driving circuit LD and the second upper driving circuit UD2 are turned "ON" to energize the squib SQ2. In this manner, the electrical current supplied to the lower driving circuit LD will not be doubled even though the squibs SQ1 and SQ2 are activated apparently at the same time.

The operation of the control system 10 for the occupant protection apparatus 11 in accordance with this embodiment will now be explained. When a collision occurs, the control system 10 for the occupant protection apparatus 11 first determines the magnitude of the collision impact based on the deceleration of the vehicle as measured by the G-sensor 15. The deceleration is then integrated by the control unit 19 to calculate an integrated value ΔV. The integrated value ΔV of the deceleration is then compared by the control unit 19 with a first threshold value g1. If the integrated value ΔV of the deceleration is equal to or greater than the first threshold value g1, the driving circuits UD1 and LD are energized for a predetermined period of time TI to activate the first squib SQ1 within the dual-stage inflator 23. If the integrated value ΔV is smaller than the first threshold value g1, the first and second squibs SQ1 and SQ2 will not be activated. The threshold value or level is a standard predetermined value for deciding whether the airbag is operated (inflated) or not. In this embodiment, when the deceleration of the vehicle exceeds the first threshold value g1, a decision is made to operate (inflate) the airbag by igniting or activating the first squib SQ1.

After it has been determined that the driving circuits UD1 and LD should be energized to activate the first squib SQ1, the integrated value ΔV is then compared by the control unit 19 with a second threshold value g2. In this embodiment, when the deceleration of the vehicle exceeds the second threshold value g2, a decision is made to further operate (inflate) the airbag by igniting or activating the second squib SQ2. The second squib SQ2 will be activated only if the integrated value ΔV is equal to or greater than the second threshold value g2, and the predetermined period of time T1 for activation of the first squib SQ1 has elapsed. Therefore, if the integrated value ΔV is smaller than the second threshold value g2 at the end of the predetermined period of time T1, the circuits UD2 and LD will not be energized to activate the second squib SQ2 until the integrated value ΔV of the deceleration becomes equal to or greater than the second threshold value g2.

On the other hand, if the integrated value ΔV becomes equal to or greater than the second threshold value g2 during the energization of the driving circuits UD1 and LD, a flag is set to indicate that there is a request for activating the second squib SQ2. Thereafter, upon elapse of the activation time period T1, the driving circuits UD2 and LD are energized for a predetermined time period T2 to activate the second squib SQ2.

Figure 2:
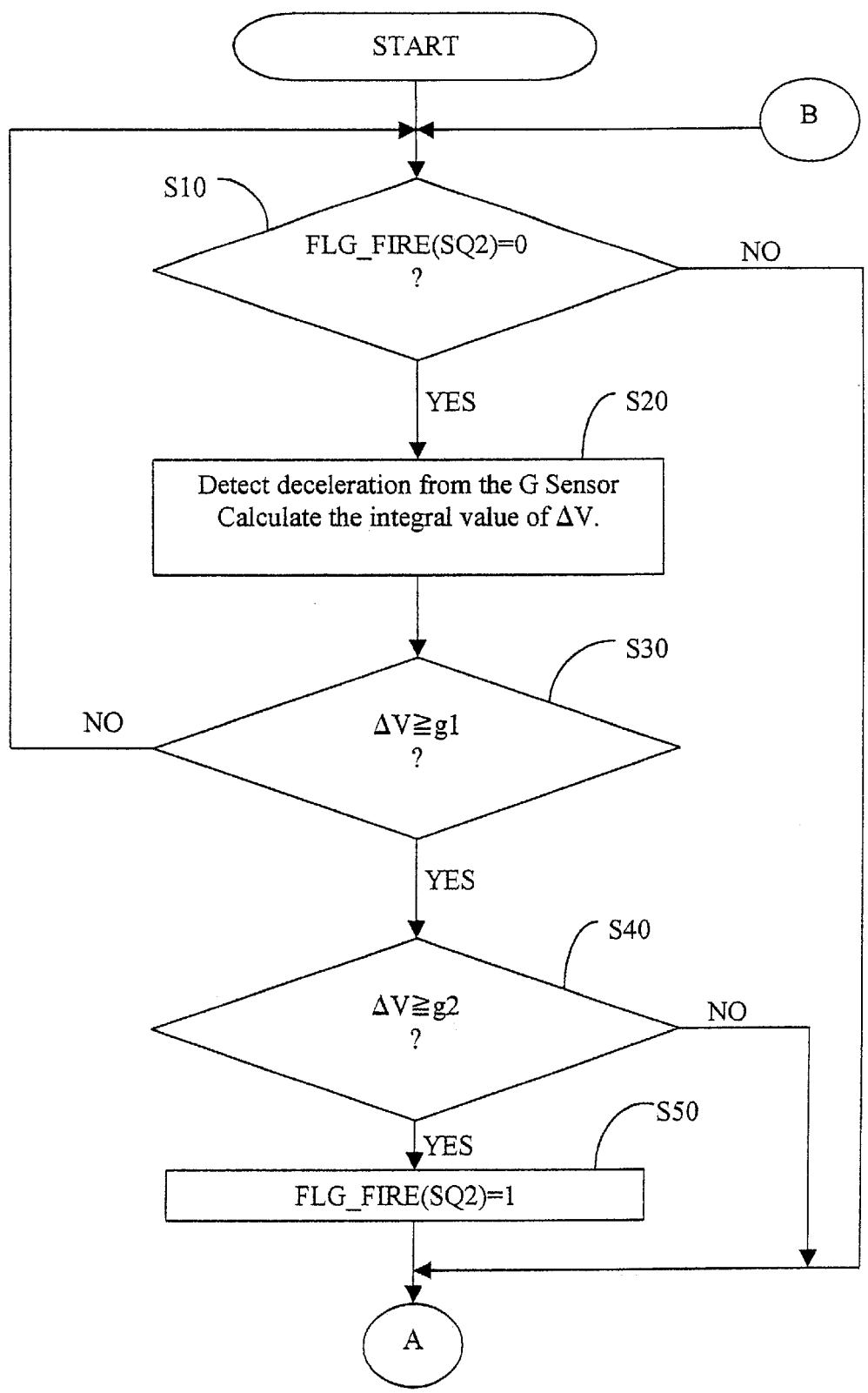
FIG. 2 is a flowchart of a first part of an operation performed by the control system of the occupant protection apparatus in accordance with the first embodiment of the present invention.
Figure 3:
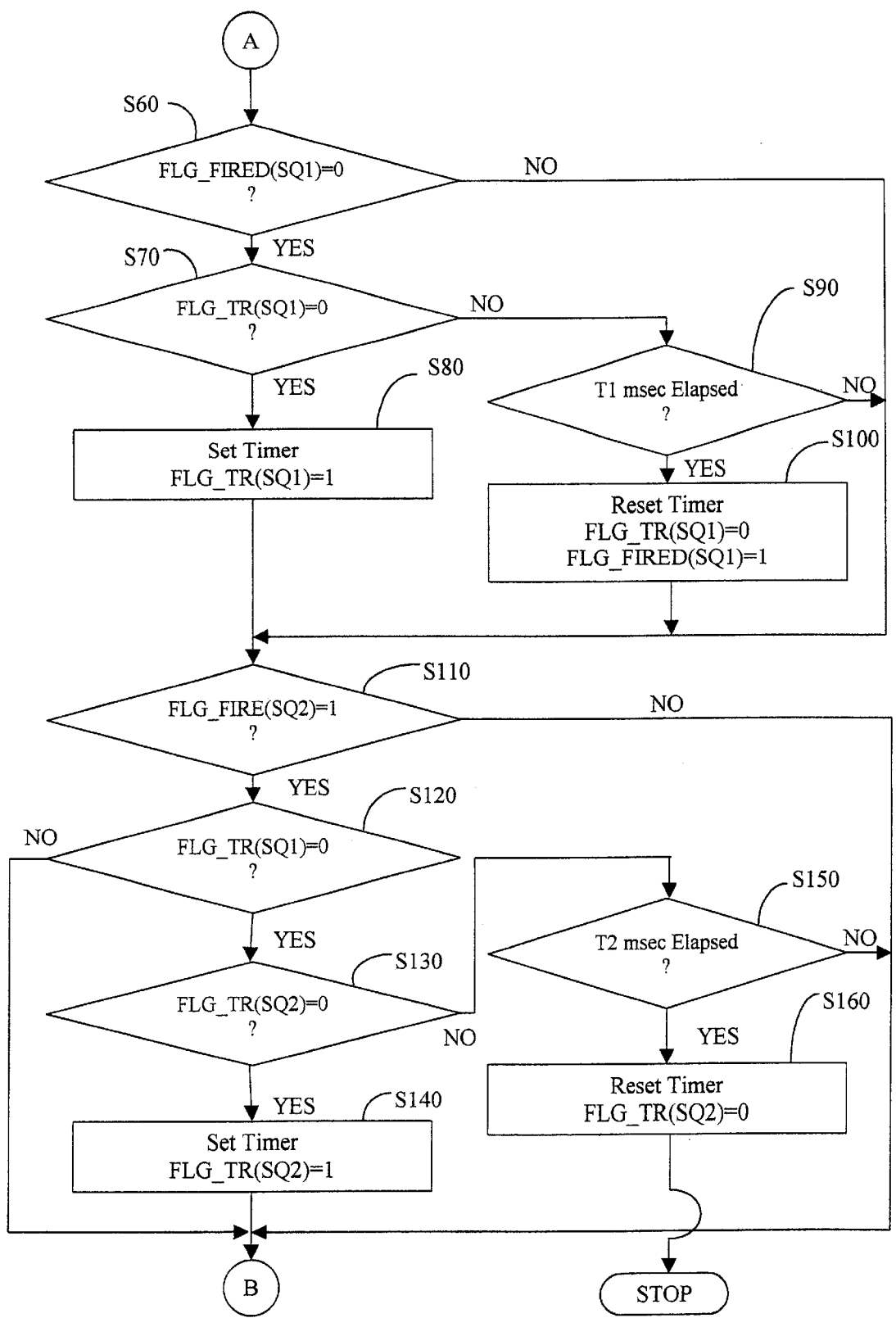
FIG. 3 is a flowchart of a second part of the operation performed by the control system of the occupant protection apparatus in accordance with the first embodiment of the present invention.

The operation of the control system 10 for the occupant protection apparatus 11 in accordance with this embodiment will now be described in detail with reference to the flowcharts shown in FIGS. 2 and 3. This operation is performed by the control unit 19 in accordance with the deployment control program stored therein. The flowchart shown in FIG. 2 describes a first part of the operation, while the flowchart shown in FIG. 3 describes a second part of the operation. In the first part of the operation as seen in FIG. 2, that is steps S10–S50, it is determined whether the squibs SQ1 and SQ2 need to be activated. In the second part of the operation as seen in FIG. 3, that is steps S60–S160, the squibs SQ1 and SQ2 are activated based on the determinations made in the first part.

The operation of the deployment control program starts when an ignition switch of an engine (not shown) is turned "ON". As the engine is started, power is supplied from the power source 12 to the control unit 19.

In step S10, it is determined whether a flag FLG_FIRE (SQ2) is zero. The flag FLG_FIRE (SQ2) is a flag that indicates whether the second squib SQ2 should be activated. If the flag FLG_FIRE (SQ2) is one, it means that the squib SQ2 should be activated when the energization of the driving circuits UD1 and LD is finished. If the flag FLG_FIRE (SQ2) is zero, it means that the squib SQ2 should not be activated. Accordingly, if the flag FLG_FIRE (SQ2) is zero, the control unit 19 proceeds to step S20. Otherwise, control proceeds to step S60. The flag FLG_FIRE (SQ2) will be described in greater detail below.

In step S20, a deceleration of the vehicle is measured by the G-sensor 15. The integrated value ΔV is calculated by the control unit 19 based on the value of deceleration measured by the G-sensor 15.

Then, the control unit 19 proceeds to step S30, where it compares the integrated value ΔV of the deceleration calculated at step S20 with a predetermined first threshold value g1 to determine whether the first squib SQ1 needs to be activated. The first threshold value g1 is a threshold value for activation of the first squib SQ1. If the integrated value ΔV of the deceleration is equal to or greater than the first threshold value g1, the control unit 19 proceeds to step S40. Otherwise, the control unit 19 returns to step S10 to repeat steps S10–S30.

In step S40, the control unit 19 further compares the integrated value ΔV of the deceleration calculated at step S20 with a predetermined second threshold value g2 to determine whether the second squib SQ2 needs to be activated. The second threshold value g2 is a threshold value for activation of the second squib SQ2, and is generally greater than the first threshold value g1. If the integrated value ΔV of the deceleration is equal to or greater than the second threshold value g2, the control unit 19 proceeds to step S50. Otherwise, the control unit 19 proceeds to step S60 as seen in FIG. 2.

In step S50, since it has previously been determined that the integrated value ΔV of the deceleration is equal to or greater than the second threshold value g2 in step S40, the flag FLG_FIRE (SQ2) is set to one to indicate that the second squib SQ2 should be activated.

Referring to the flowchart shown in FIG. 3, in step S60, it is determined whether a flag FLG_FIRED (SQ1) is zero. The flag FLG_FIRED (SQ1) indicates whether the activation of the first squib SQ1 has finished. If the flag FLG_FIRED (SQ1) is one, it means that the first squib SQ1 has been activated. If the flag FLG_FIRED (SQ1) is zero, it means that the second squib SQ2 has not been activated. In other words, if the flag FLG_FIRED (SQ1) is zero, then the first squib SQ1 has not yet been activated, and the control unit 19 proceeds to step S70. On the other hand, if the first squib SQ1 has already been activated, then the flag FLG_FIRED (SQ1) is one, and the control unit 19 proceeds to step S110.

In step S70, it is determined whether a flag FLG_TR (SQ1) is zero. The flag FLG_TR (SQ1) indicates whether the driving circuits UD1 and LD are being energized to activate the first squib SQ1. If the flag FLG_TR (SQ1) is zero, then the driving circuits UD1 and LD are not being energized. Therefore, the driving circuits UD2 and LD are available for energization. If the flag FLG_TR (SQ1) is one, then the driving circuits UD1 and LD are being energized. Therefore, the driving circuit UD2 is not available for energization. If the flag FLG_TR (SQ1) is zero, the control unit 19 proceeds to step S80. If the flag FLG_TR (SQ1) is one, the control unit 19 proceeds to step S90.

In step S80, the timer is started to measure the period of time during which the driving circuits UD1 and LD are energized to activate the squib SQ1. At the same time, the energization of the driving circuits UD1 and LD are initiated, and the flag FLG_TR (SQ1) is set to one to indicate that the driving circuits UD1 and LD are being energized.

In step S90, it is determined whether a predetermined time period T1 (msec) has elapsed since the timer started measuring the time in step S80. If the predetermined period of time T1 (msec) has elapsed, the control unit 19 proceeds to step S100. Otherwise, the control unit 19 proceeds to step S110.

In step S100, the timer is reset since it had been started when the predetermined period of time T1 started at step S80. Also, in step S100, the energization of the driving circuits UD1 and LD for activating the squib SQ1 is terminated. Furthermore, the flag FLG_TR (SQ1) is set to zero to indicate that the driving circuits UD1 and LD are not being energized. The flag FLG_FIRED (SQ1) is set to one to indicate that the first squib SQ1 has been activated. Thereafter, the control unit 19 proceeds to step S110.

In step S110, it is determined whether the flag FLG_FIRE (SQ2) is zero. The flag FLG_FIRE indicates whether the squib SQ2 should be activated, and is set to one in step S50. In other words, if the flag FLG_FIRE (SQ2) is zero, then the second squib SQ2 does not need to be activated, and the control unit 19 returns to step S10. On the other hand, if the flag FLG_FIRE (SQ2) is one, then the second squib SQ2 needs to be activated and the control unit 19 proceeds to step S120.

In step S120, it is determined whether the flag FLG_TR (SQ1) is zero. In other words, if the energization of the driving circuits UD1 and LD for activating the first squib SQ1 has been terminated, then the flag FLG_TR (SQ1) is zero, and the driving circuits LD is available for another energization. Conversely, if the flag FLG_TR (SQ1) is one, then the shared driving circuit LD is not available for activation of the second squib SQ2. Therefore, the second squib SQ2 cannot be activated at this time. Accordingly, if the flag FLG_TR (SQ1) is zero, the control unit 19 proceeds to step S130. If the flag FLG_TR (SQ1) is one, the control unit 19 returns to step S10.

In step S130, it is determined whether a flag FLG_TR (SQ2) is zero. The flag FLG_TR (SQ2) indicates whether the driving circuits UD2 and LD are being energized to activate the second squib SQ2. If the flag FLG_TR (SQ2) is zero, the control unit 19 proceeds to step S140. If the flag FLG_TR (SQ2) is not zero, the control unit 19 proceeds to step 510.

In step S140, the timer is started to measure the period of time during which the driving circuits UD2 and LD are energized. At the same time, the energization of the driving circuits UD2 and LD for activating the second squib SQ2 is initiated. Further, the flag FLG_TR (SQ2) is set to one to indicate that the driving circuits UD2 and LD are being energized.

In step S150, it is determined whether a predetermined period of time T2 (msec) has elapsed since the energization of the driving circuits UD2 and LD started in step S140. If the predetermined period of time T2 (msec) has elapsed, the energization is finished. Therefore, the control unit 19 proceeds to step S160. Otherwise, the control unit 19 returns to step S10 to wait for the predetermined period of time T2 to elapse.

In step S160, the timer that has started measuring time in step S140 is reset, and the energization of the driving circuits UD2 and LD for activating the second squib SQ2 is terminated. Furthermore, the flag FLG_TR (SQ2) is set to zero to indicate that the driving circuits UD2 and LD are not being energized. Then, the process ends.

The flowcharts shown in FIGS. 2 and 3 will now be described more particularly with reference to an automobile collision scenario. As the ignition switch is turned "ON", the power source 12 is powered. The control unit 19 starts the deployment control program, which performs the operation in accordance with the flowcharts described above. At this stage, the collision has not occurred. Therefore, it is determined that the integrated value ΔV of the deceleration, which is to be calculated at step S20, is not equal to or greater than the first threshold value g1. Therefore, "NO" is returned at step S30, so that the control unit 19 returns to step S10.

When a collision occurs, if the integrated value ΔV of the deceleration is equal to or greater than the first threshold value g1 in step S30, the control unit 19 proceeds to step S40. In step S40, it is determined whether the integrated value ΔV is equal to or greater than the second threshold value g2. Assuming that the integrated value ΔV of this particular collision is greater than the first threshold value g1 but has not reached the second threshold value g2, "NO" will be returned in step S40. Accordingly, the control unit 19 proceeds to step S60.

In step S60, since the first squib SQ1 has not yet been activated, the flag FLG_FIRED (SQ1) is zero. Accordingly, the control unit 19 proceeds to step S70. In step S70, since the driving circuits UD1 and LD are not being energized, the flag FLG_TR (SQ1) is zero. Accordingly, the control unit 19 proceeds to step S80. In step S80, the timer is started to measure the time of energization of the driving circuits UD1 and LD. At the same time, the energization of the driving circuits UD1 and LD is initiated, and the flag FLG_TR (SQ1) is set to one to indicate that the driving circuits UD1 and LD are being energized. Then, in step S110, it is determined whether the flag FLG_FIRE (SQ2), which indicates whether the second squib SQ2 should be activated, is one. In this example, since it has been determined that the integrated value ΔV is smaller than the second threshold value g2 in step S40, the FLG_FIRE (SQ2) has not been set to one in step S50. Accordingly, the control unit 19 returns to step S10.

Thereafter, steps S10–S30 are repeated. More specifically, the integrated value ΔV and the first threshold value g1 are continuously compared, until "YES" is returned in step S30. In step S40, the integrated value ΔV is compared with the second threshold value g2. Assuming that the integrated value ΔV is still smaller than the second threshold value g2, the control unit 19 proceeds to step S60. In step S60, again, since the first squib SQ1 has not yet been activated, the control unit 19 proceeds to step S70. In step S70, it is determined whether the driving circuits UD1 and LD are being energized. At this time, since the FLG_TR (SQ1) has been turned to one at S80 previous time, the driving circuits UD1 and LD are still being energized. Accordingly, the control unit 19 proceeds to step S90. In step S90, it is determined whether the predetermined time period T1 has elapsed since the timer started measuring time at step S80 previous time. Assuming that the predetermined time period T1 has not elapsed yet, the control unit 19 proceeds to step S110. As in the previous time, "NO" is returned in step S110. Accordingly, the control unit 19 returns to step S10.

Thereafter, steps S10–S30 are repeated again. Assuming that the integrated value ΔV exceeds the second threshold value g2 this time, then a "YES" is returned in step S40. Consequently, the flag FLG_FIRE (SQ2), which indicates whether the second squib SQ2 should be activated, is set to one in step S50. In step S60, since the first squib SQ1 has still not been activated, "YES" is returned. In step S70, since the driving circuits UD1 and LD are still being energized, "NO" is returned. In step S90, again assuming that the predetermined time period T1 has not elapsed, the control unit 19 proceeds to step S110. In step S110, since the flag FLG_FIRE (SQ2) has been set to one in step S50, the control unit 19 proceeds to step S120. At step S120, since the energization of the first squib SQ1 has not been terminated, "NO" is returned. Accordingly, the control unit 19 returns to step S10.

Once again, steps S10–S70 are repeated in the aforesaid manner. In step S90, assuming that this time the predetermined time period T1 has elapsed, the control unit 19 proceeds from step S90 to step S100. In step S100, the timer that has been started in step S80 previously is reset, and the energization of the driving circuits UD1 and LD for activating the first squib SQ1 is terminated. Furthermore, the flag FLG_TR (SQ1) is reset to zero to indicate that the driving circuits UD1 and LD are not being energized. Moreover, the flag FLG_FIRED (SQ1) is set to one to indicate that the activation of the first squib SQ1 has been terminated.

In step S110, since the FLG_FIRE (SQ2) has been set to one in step S50, a "YES" is returned. In step S120, since the energization of the driving circuits UD1 and LD has already been terminated in step S100, the control unit 19 proceeds to step S130. In step S130, since the driving circuits UD2 and LD have not been energized, the flag FLG_TR (SQ2) is zero. Accordingly, the control unit 19 proceeds to step S140. In step S140, the timer is started to measure the time of energization of the driving circuits UD2 and LD. At the same time, the energization of the driving circuits UD2 and LD is initiated, and the flag FLG_TR (SQ2) is set to one to indicate that the driving circuits UD2 and LD are being energized. Then, the control unit 19 returns to step S10.

The control unit 19 repeats steps S10–S50. In step S60, since the first squib SQ1 has already been activated, the control unit 19 proceeds to step S110. In step S110, since the flag FLG_FIRE (SQ2) is one, as has been set in step S50, the control unit 19 proceeds to step S120. In step S120, since the energization of the driving circuits UD1 and LD has been terminated, the control unit 19 proceeds to step S130. In step S130, since the energization of the driving circuits UD2 and LD has been started in step S140 previously, the flag FLG_TR (SQ2) is now one. Therefore, the control unit 19 proceeds to step S150. In step S150, if the predetermined period of time T2 has not elapsed since the energization of the driving circuits UD2 and LD has started, the control unit 19 returns to step S10. Upon returning to step S10, the control unit 19 repeats steps S10–130 in the aforesaid manner. In step S150, once the predetermined period of time T2 elapses, the control unit 19 proceeds to step S160, where the timer is reset, the energization of the driving circuits UD2 and LD is terminated, and the flag FLG_TR (SQ2) is set to zero.

As described above, the energization of the driving circuits UD2 and LD for activating the second squib SQ2 starts only if the integrated value ΔV becomes equal to or greater than the second threshold value g2, and after the energization of the driving circuits UD1 and LD for activating the first squib SQ1 is finished. In other words, the driving circuits UD1 and LD for activating the first squib SQ1 and the driving circuits UD1 and LD for activating the second squib SQ2 will not be energized at the same time.

While the first and second squibs SQ1 and SQ2 are activated sequentially, the activation timings between the activation of first and second squibs SQ1 and SQ2 are so close together that the inflators appear to be activated at the same time. The activation timings of the first and second squibs SQ1 and SQ2 will now be described in detail. After energization of the corresponding activation circuits is started, it generally takes about 30 msec for the igniter material of the inflator to be ignited and the air bag to be activated. On the other hand, it is only about 3 msec for the electrical current to be applied to the activation circuits, or more specifically, for the transistors to be turned "ON".

Therefore, the second squib SQ2 can be activated to inflate the air bag while the air bag is inflated by the first squib SQ1, once activation of the first squib SQ1 is complete. In other words, the inflation of the air bag by the two squibs SQ1 and SQ2 can occur substantially simultaneously. Therefore, the combustion gas pressure applied to the air bag will not be affected by the different timings at which the activation circuits of the two squibs are activated. Accordingly, the air bag can effectively protect the vehicle occupant.

Control unit 19 carries out the activation timing of the squibs SQ1 and SQ2. The activation timing of the squibs SQ1 and SQ2 for sequentially energizing the squibs SQ1 and SQ2 will now be described with reference to the timing chart shown in FIG. 4.

Figure 4:
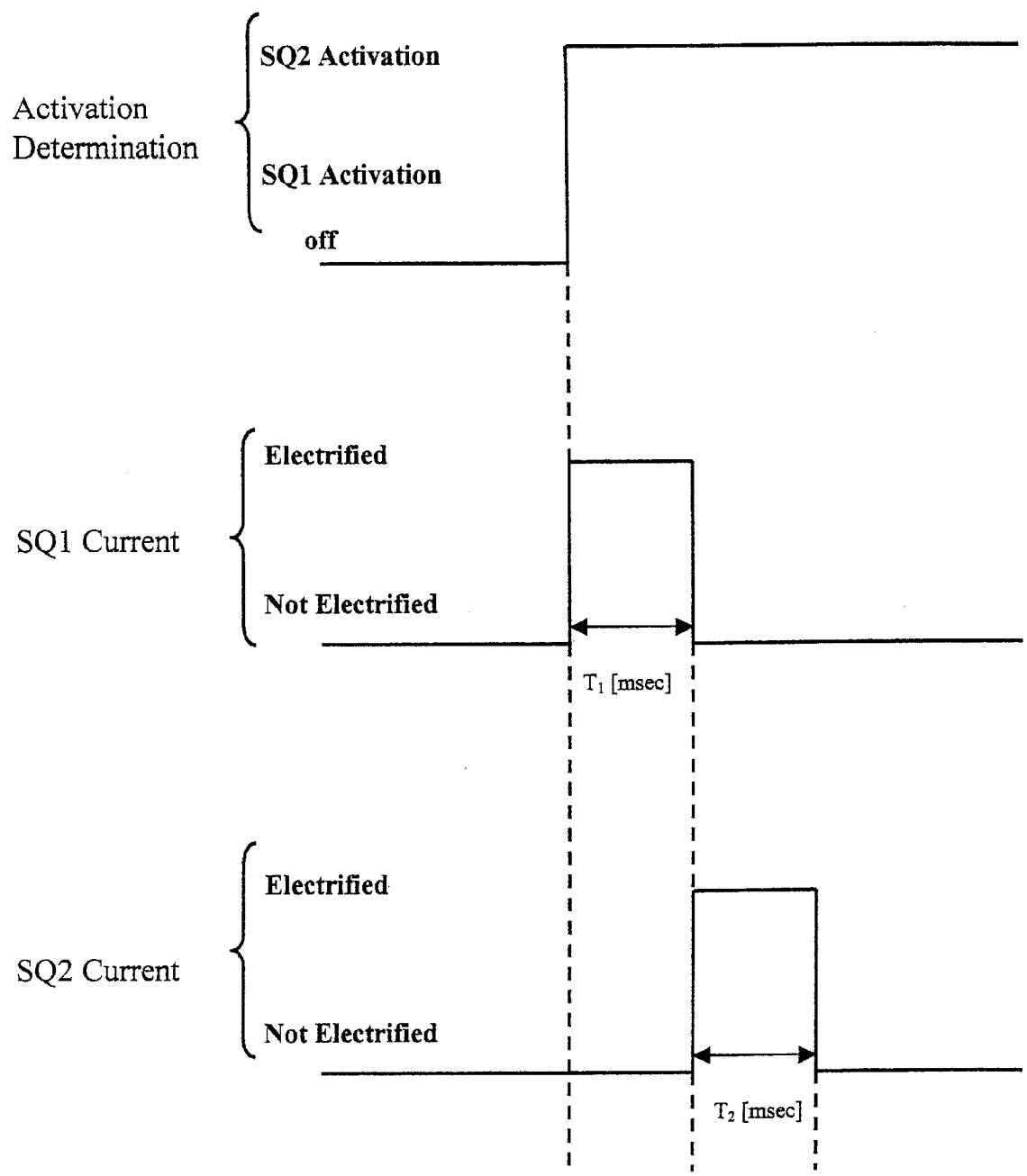
FIG. 4 is a timing chart of energization, in which the squibs SQ1 and SQ2 are energized sequentially in accordance with the first embodiment of the present invention.

With reference to FIG. 4, the energization timings will now be described. If the integrated value ΔV of the deceleration is equal to or greater than both the first and second threshold values g1 and g2, then it is determined that both the first and second squibs SQ1 and SQ2 should be activated. Once it is determined that the first squib SQ1 should be activated, driving circuits UD1 and LD are immediately energized with the current I (amperes) for the T1 (msec) to activate the first squib SQ1. Then, immediately after the termination of the energization of the first squib SQ1, the driving circuits UD2 and LD are energized with the current I (amperes) for T2 (msec) to activate the second squib SQ2. In this manner, the shared driving circuits LD does not need to pass twice as much electrical current therethrough.

In this manner, the squibs SQ1 and SQ2 share either their upstream side or downstream side of the activation circuits. Therefore, the number of components can be reduced. Accordingly, an increase in the manufacturing costs can be avoided.

According to the present invention, once the vehicle collides, the first and second squibs SQ1 and SQ2 are activated based on the integrated value ΔV of the measured deceleration of the vehicle. If the decision to activate the second squib SQ2 happens to be made during the activation time period of the first squib SQ1, the second squib SQ2 is activated only upon completion of the activation of the first squib SQ1. Therefore, the activation time periods of the first and second squibs SQ1 and SQ2 do not overlap. In other words, the shared activation circuit does not need to pass twice as much electrical current. Therefore, an activation circuit that has substantially the same rating as conventional activation circuits can be utilized as the shared activation circuit.

As a result, an increase in the manufacturing costs can be avoided. Besides, even when the occupant protection system has two or more air bags, spiral cables, harnesses, connectors, and activation circuits, these components can be stored within the steering wheel.

Second Embodiment

Referring now to FIG. 5, a control system 10' for an occupant protection apparatus 11 in accordance with the second embodiment of the present invention. In view of the similarity between the first and second embodiments, the components of this second embodiment that have the same function as the components of the first embodiment are given the identical referential numerals. Moreover, explanations of these similar components and their operations of the second embodiment that function in a similar manner as in the first embodiment will be omitted from the second embodiment. Only those components and their operations of the second embodiment that are different in structure and function from the first embodiment will be explained herein.

In the control system 10' of the second embodiment of the present invention, the squibs SQ1 and SQ2 are commonly connected at their upstream sides of the activation circuits. In other words, the upper driving circuit UD2 forms a common connected portion of the activation circuits.

In the control system 10', the constant current control device, (not shown) is provided in at least both of the first and second lower driving circuits LD1 and LD2 to maintain a constant supply of current to the squibs SQ1 and SQ2. In order to activate all of the driving circuits UD2, LD1, and LD2 apparently at the same time, the upper driving circuit UD and the first lower driving circuit LD1 are first turned "ON" to energize the first squib SQ1. Upon completion of the energization of the squib SQ1, the upper driving circuit UD and the second lower driving circuit LD2 are turned "ON" to energize the second squib SQ2. In this manner, the current supplied to the upper driving circuit UD will not be doubled even though the squibs SQ1 and SQ2 are activated apparently at the same time.

Third Embodiment

Figure 6:
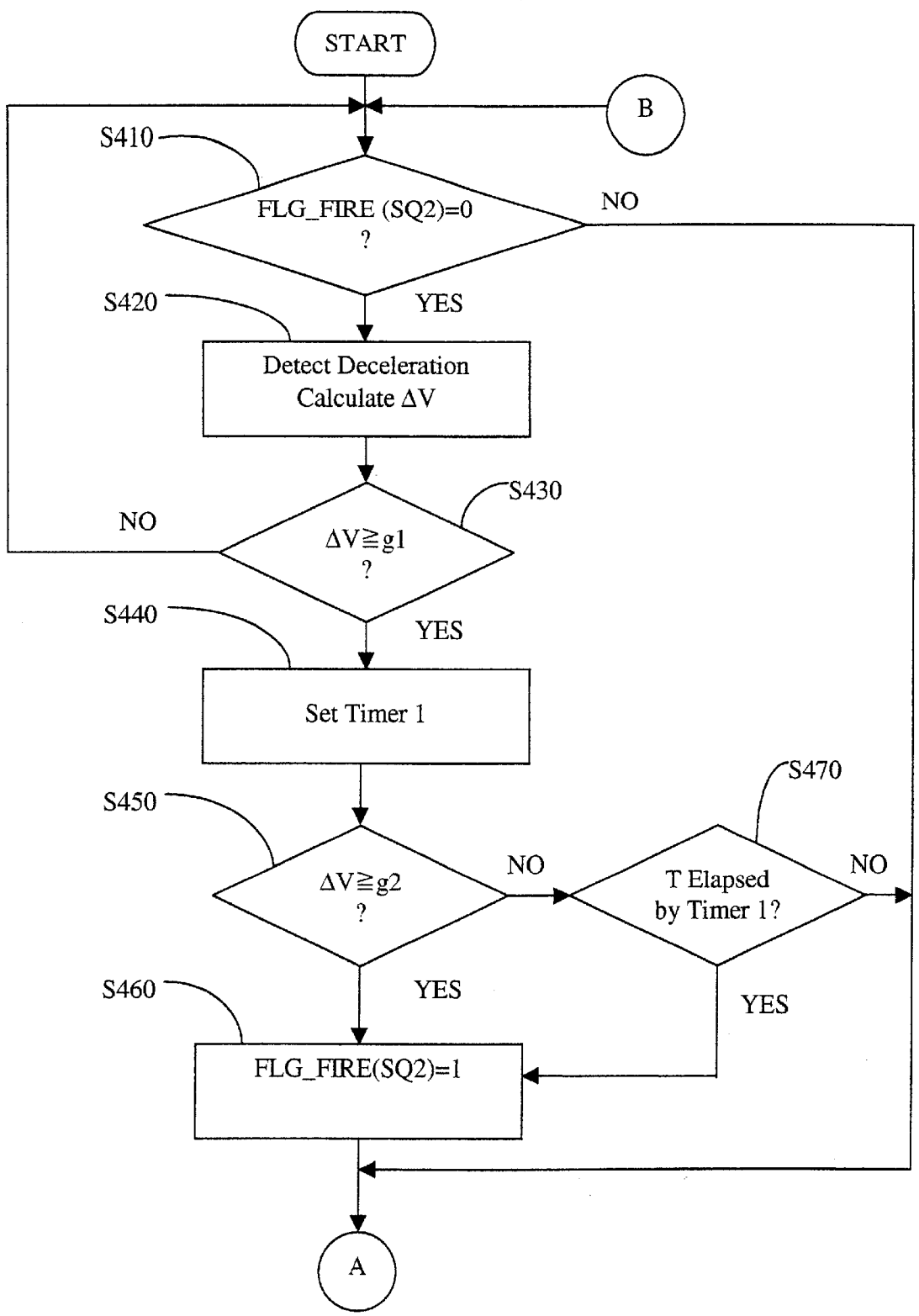
FIG. 6 is a flowchart of a first part of an operation performed by the control system of the occupant protection apparatus in accordance with a third embodiment of the present invention.
Figure 7:
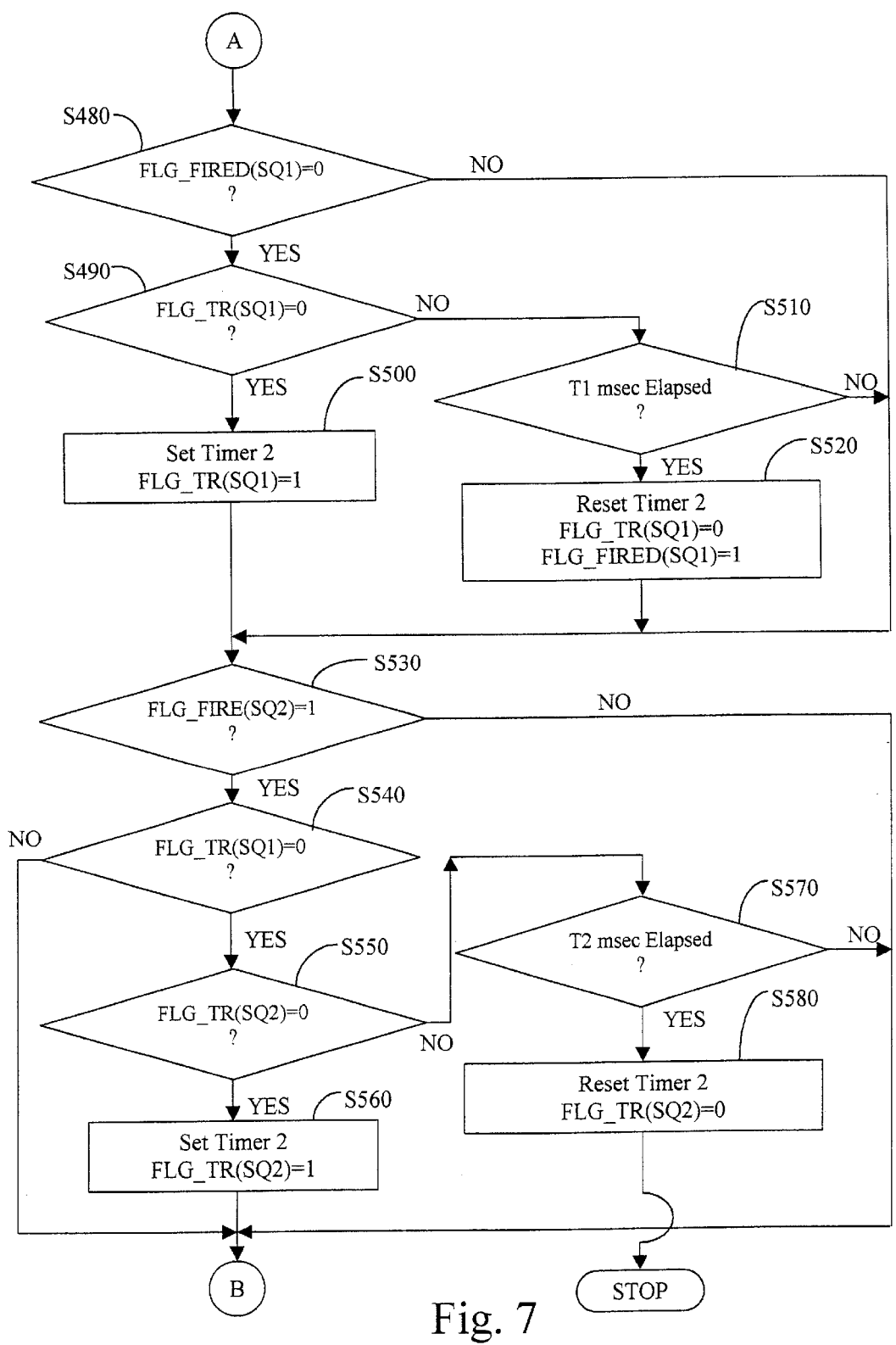
FIG. 7 is a flowchart of a second part of the operation performed by the control system of the occupant protection apparatus in accordance with the third embodiment of the present invention.
Figure 8:
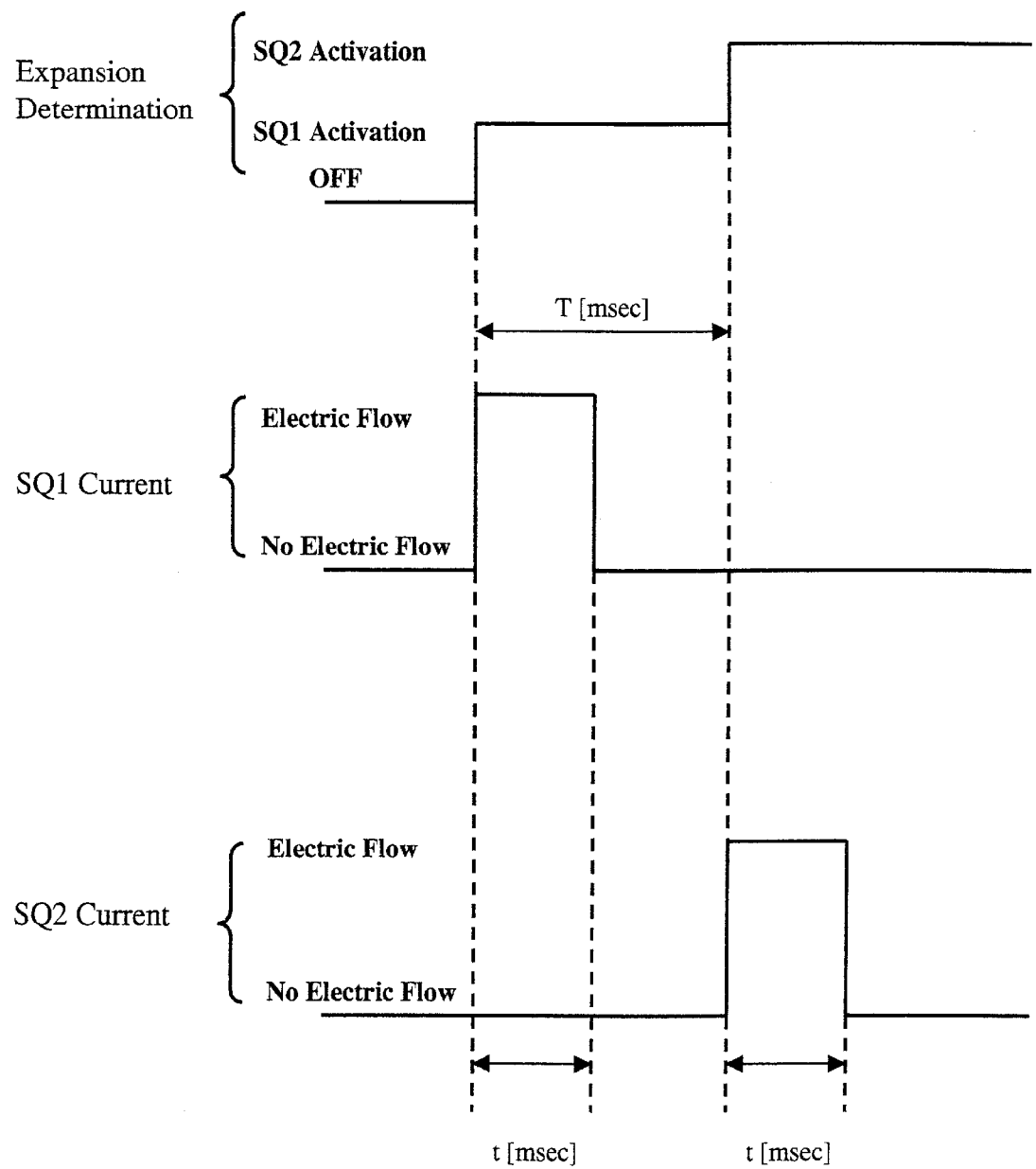
FIG. 8 is a timing chart of energization in accordance with the third embodiment of the present invention, in which the squib SQ1 is first energized, and then after a delay time T elapses the squib SQ2 is energized.

Referring now to FIGS. 6, 7 and 8, a pair of flowcharts of a modified deployment program is illustrated in accordance with a third embodiment of the present invention. The deployment control program represented by the flowcharts can be run by the control unit 19 of either the apparatus schematically illustrated in FIG. 1 or FIG. 5. Accordingly, the operation in accordance with the third embodiment will now be explained with reference to the flowcharts shown in FIGS. 6 and 7. The flowcharts in FIGS. 6 and 7 are the same as the flowcharts of the first embodiment shown in FIGS. 2 and 3, except that this third embodiment utilizes two timers or timing programs in the control unit 19.

In the preceding embodiments, the second squib SQ2 is not activated until the integrated value ΔV of the deceleration becomes equal to or greater than the second threshold value g2. In this embodiment, the activation circuits that correspond to the second squib SQ2 can be energized automatically to activate the second squib SQ2 91 when a predetermined period of time T (msec) elapses after the integrated value ΔV becomes equal to or greater than the first threshold value g1, even if the integrated value ΔV is not equal to or greater than the second threshold value g2 at the end of the period T.

The first timer 1 of the control unit 19 measures the time after the control unit 19 determines that the integrated value ΔV is equal to or greater than the first threshold value g1. The second timer 2 measures the period of time during which the activation circuits are energized.

More specifically, once the control unit 19 determines that the integrated value ΔV is equal to or greater than the first threshold value g1 in step S430, which corresponds to step S30 of the first embodiment, the first timer 1 is started in S440. Then, in step S450 which corresponds to step S40, the control unit 19 determines whether the integrated value ΔV is equal to or greater than the second threshold value g2. If the integrated value ΔV is equal to or greater than the second threshold value g2, the control unit 19 proceeds to step S460. Otherwise, the control unit 19 proceeds to step S470. In step S470, the control unit 19 determines whether the period of time T has elapsed by the first timer 1 since the first timer 1 was started in step S440. If it has not, the control unit 19 proceeds to step S480, which corresponds to step S60. If the time T has elapsed by the first timer 1, then the control unit 19 proceeds to step S460, which corresponds to step S50. In step S460, the flag FLG_FIRE (SQ2) is turned to 1. In other words, in step S460 it is determined that the squib SQ2 should be activated.

The second timer 2 is utilized in steps S500–S520 and steps S560–S580 in the same manner as the timer utilized in steps S80–S100 and steps S140–S160 of the first embodiment. In this manner, the occupant protection system can have a function which energizes the activation circuits that correspond to the second squib SQ2 after a period of time T elapses, since the integrated value ΔV becomes equal to or greater than the first threshold value g1 regardless of whether or not the integrated value ΔV is equal to or greater than the second threshold value g2.

FIG. 8 is a timing chart of the squibs SQ1 and SQ2 in accordance with the third embodiment. As seen in FIG. 8, if the integrated value ΔV of the deceleration is equal to or greater than the first threshold value g1, it is determined that the first squib SQ1 should be activated. Once it is determined that the first squib SQ1 should be activated, the activation circuits for the first squib SQ1 are energized immediately with the current I (amperes) for t (msec) to activate the first squib SQ1.

After the period of time T (msec) elapses, if the integrated value ΔV of the deceleration becomes equal to or greater than the first threshold value g1, it is determined that the second squib SQ2 should be activated. Once it is determined that the second squib SQ2 should be activated, the activation circuits for the second squib SQ2 are immediately energized with the current I (amperes) for the time period t (msec) to activate the squib SQ2.

Fourth Embodiment

Figure 9:
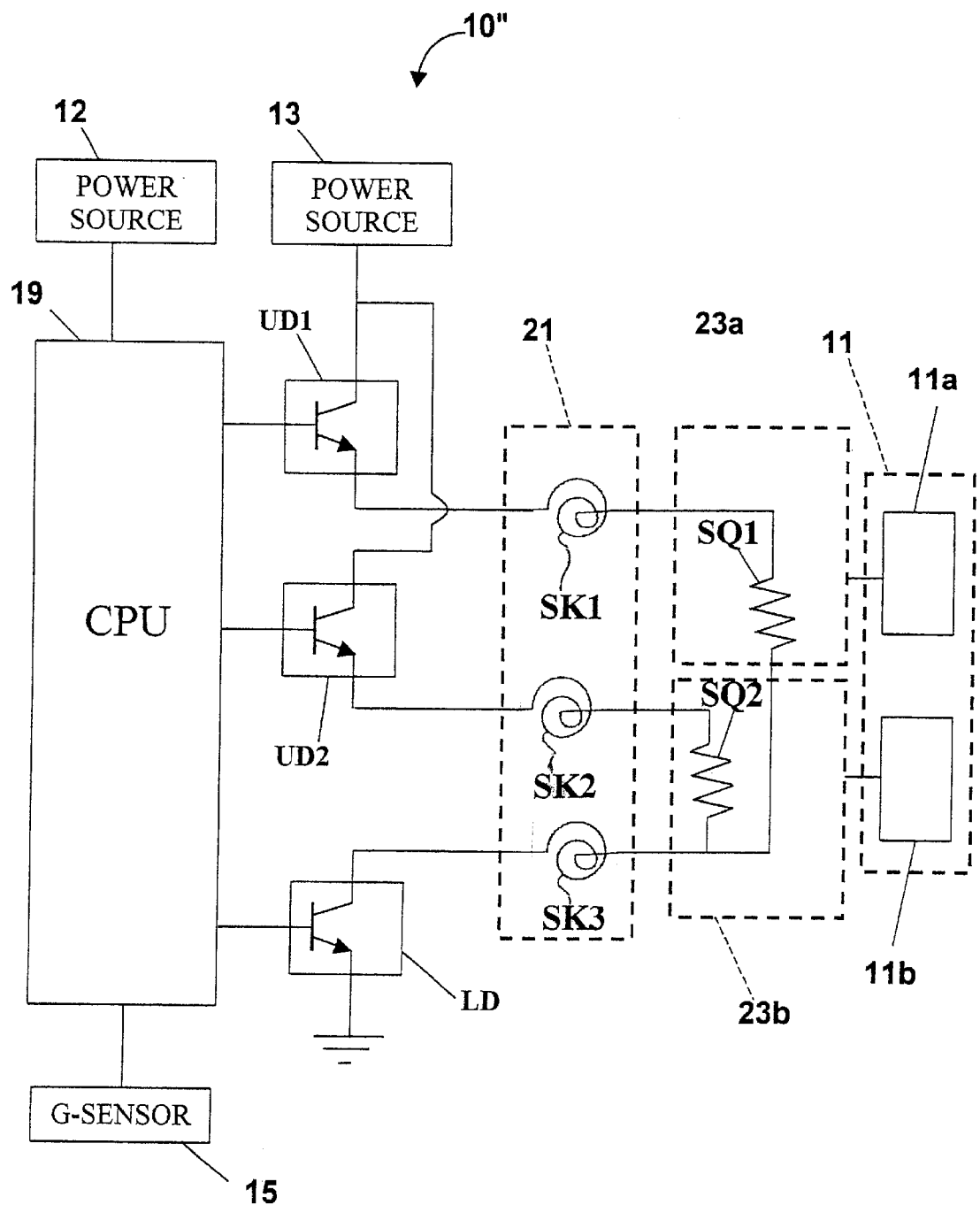
FIG. 9 is a schematic circuit diagram of a control system for an occupant protection apparatus in accordance with the fourth embodiment of the present invention in which the activation circuits of the squibs SQ1 and SQ2 share the lower driving circuit.

Referring now to FIG. 9, a schematic circuit diagram of a control system 10" is illustrated in accordance with a fourth embodiment of the present invention. Basically, this fourth embodiment is identical to the first embodiment, except that the control system 10" has been modified to show a pair of airbags 11a and 11b being inflated by a pair of single spaced inflators 23a and 23b. In view of the similarities between this fourth embodiment and the first embodiment, these components of this fourth embodiment will not be discussed or illustrated in detail herein. Rather, it will be apparent to those skilled in the art from this disclosure that the explanations of the components and their operations in this fourth embodiment are identical to the corresponding components of the first embodiment. In other words, the employment control program of the first, third and fourth embodiments can be utilized to operate the control system 10' of this fourth embodiment.

Fifth Embodiment

Referring now to FIG. 10, a schematic circuit diagram of a control system 10''' is illustrated in accordance with a fifth embodiment of the present invention. Basically, this embodiment is substantially identical to the second embodiment illustrated in FIG. 5, except that two airbags 11a and 11b are operated by a pair of single spaced inflators 23a and 23b, respectively. In view of the similarities between this fifth embodiment and the second embodiment, this embodiment will not be discussed and/or illustrated in detail herein. Rather, it will be apparent to those skilled in the art from this disclosure that the explanations of the components and their operations in this fifth embodiment are identical to the corresponding components of the second embodiment. Moreover, it will be apparent to those skilled in the art from this disclosure that the deployment control programs utilized to run the second embodiment can also be utilized to run this fifth embodiment.

In the aforesaid embodiments, an occupant position sensor can be utilized in conjunction with the G-sensor. The occupant position sensor can be a plurality of pressure sensors installed underneath a passenger seat, and/or a supersonic wave sensor that is installed in the dashboard and measures the distance between the occupant and the dashboard. The occupant position sensor is well known in the art, and therefore, would be obvious to one of ordinary skill in the art without further explanation.

The terms of degree such as "substantially", "about" and "approximately" as used herein mean a reasonable amount of deviation of the modified term such that the end result is not significantly changed. These terms should be construed as including a deviation of ±10% of the modified term if this would not negate the meaning of the word it modifies.

This application claims priority to Japanese Patent Application No. H11-1261006. The entire disclosure of Japanese Patent Application No. H11-261006 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims.

For example, in the above-described embodiments, the control system determines whether a squib should be activated based on the deceleration of the vehicle. Alternatively in this embodiment, the activation of each squib is controlled based on the presence and position of the occupant as well as the deceleration of the vehicle. The presence and position of the occupant can be detected by a weight sensor and/or an ultrasonic sensor, which send signals to the CPU. Furthermore, the foregoing description of the embodiments according to the present invention are provided for illustration only, and not for the purpose of limiting the invention as defined by the appended claims and their equivalents. Thus, the scope of the invention is not limited to the disclosed embodiments.

What is claimed is:

1. A control system for an occupant protection apparatus of a vehicle comprising:
   first and second activating devices adapted to activate the occupant protecting apparatus;
   a control unit operatively coupled to said first and second activating devices, said control unit including a collision diagnostic portion that determines a level of a collision of the vehicle based on deceleration of the vehicle during the collision;
   a deceleration sensor operatively coupled to said control unit to provide information on the deceleration of the vehicle during the collision;
   a first activation circuit operatively coupling said control unit to said first activating device; and
   a second activation circuit operatively coupling said control unit to said second activating device, said first and second activation circuits share a commonly connected portion;
   said control unit selectively energizing at least one of said first and second activation circuits to selectively activate at least one of first and second activating devices for first and second predetermined activation time periods, respectively, based on said level of the collision determined with said collision diagnostic portion,
   said control unit being configured to receive a first activation requirement signal from said collision diagnostic portion to activate said first activating device and a second activation requirement signal from said collision diagnostic portion to activate said second activating device when said level of the collision determined by said collision diagnostic portion requires activation of both said first and second activation circuits, said control unit selectively activates said second activation circuit after completion of said first predetermined activation time period of said first activation circuit, when said second activation requirement signal overlaps with said first activation requirement signal.

2. A control system for an occupant protection apparatus according to claim 1, wherein
   said commonly connected portion of said first and second activation circuits is located on an upstream side of said first and second activating devices.

3. A control system for an occupant protection apparatus according to claim 1, wherein
   said commonly connected portion of said first and second activation circuits is located on an downstream side of said first and second activating devices.

4. A control system for an occupant protection apparatus according to claim 1, wherein
   said control unit includes a microprocessor operatively coupled to said deceleration sensor and said first and second activation circuits.

5. A control system for an occupant protection apparatus according to claim 4, wherein
   said microprocessor calculates an integrated value of deceleration measured by said deceleration sensor.

6. A control system for an occupant protection apparatus according to claim 5, wherein
   said microprocessor compares said integrated value with a first threshold value and energizes said first activation circuit for said first predetermined activation time period to activate said first activating device if said integrated value is equal to or greater than said first threshold value.

7. A control system for an occupant protection apparatus according to claim 6, wherein
   said microprocessor compares said integrated value with a second threshold value if said integrated value is equal to or greater than said first threshold value, and energizes said second activation circuit for said second predetermined activation time period to activate said second activating device if said integrated value is equal to or greater than said second threshold value and immediately after said first predetermined activation time period has lapsed.

8. A control system for an occupant protection apparatus according to claim 6, wherein
   said microprocessor compares said integrated value with a second threshold value if said integrated value is equal to or greater than said first threshold value, and energizes said second activation circuit for said second predetermined activation time period to activate said second activating device if said integrated value is equal to or greater than said second threshold value and a third predetermined period of time has lapsed after said first predetermined activation time period has lapsed.

9. A control system for an occupant protection apparatus according to claim 6, wherein said microprocessor energizes said second activation circuit for said second predetermined activation time period to activate said second activating device immediately after said first predetermined activation time period has lapsed.

10. A control system for an occupant protection apparatus according to claim 6, wherein said microprocessor energizes said second activation circuit for said second predetermined activation time period to activate said second activating device after said first predetermined activation time period has lapsed and after an additional predetermined period of time has lapsed.

11. A control system for an occupant protection apparatus according to claim 1, further comprising an air bag operatively coupled to said first and second activating devices.

12. A control system for an occupant protection apparatus according to claim 1, further comprising a first air bag operatively coupled to said first activating device; and a second airbag operatively coupled to said second activating device.

13. A control system for an occupant protection apparatus of a vehicle comprising:

occupant protecting means having at least first and second activating means; and control means for controlling said occupant protection apparatus, which protects a vehicle occupant with said occupant protecting means, said control means including deceleration sensor means for measuring a deceleration of a vehicle;

collision diagnostic means for determining a level of vehicle collision impact based on said deceleration measured with said deceleration sensor means;

a first activation circuit for activating said first activating means; and a second activation circuit for activating said second activating means, said first and second activation circuits sharing a commonly connected portion;

said control means selectively energizing at least one of said first and second activation circuits to selectively activate at least one of first and second activating devices for first and second predetermined activation time periods, respectively, based on said level of vehicle collision impact determined with said collision diagnostic means, said control means being configured to receive a first activation requirement signal from said collision diagnostic means to activate said first activating device and a second activation requirement signal from said collision diagnostic means to activate said second activating device when said level of the collision determined by said collision diagnostic means requires activation of both said first and second activation circuits, said control means selectively activates said second activation circuit upon completion of said first predetermined activation time period of said first activation circuit, when said second activation requirement signal overlaps with said first activation requirement signal.

14. A control system for an occupant protection apparatus according to claim 13, wherein said control means includes calculating means for calculating an integrated value of deceleration measured by said deceleration sensor means.

15. A control system for an occupant protection apparatus according to claim 14, wherein said calculating means compares said integrated value with a first threshold value and said control means energizes said first activation circuit for said first predetermined activation time period to activate said first activating means if said integrated value is equal to or greater than said first threshold value.

16. A control system for an occupant protection apparatus according to claim 15, wherein said calculating means compares said integrated value with a second threshold value if said integrated value is equal to or greater than said first threshold value, and said control means energizes said second activation circuit for said second predetermined activation time period to activate said second activating means if said integrated value is equal to or greater than said second threshold value and immediately after said first predetermined activation time period has lapsed.

17. A control system for an occupant protection apparatus according to claim 15, wherein said calculating means compares said integrated value with a second threshold value if said integrated value is equal to or greater than said first threshold value, and said control means energizes said second activation circuit for said second predetermined activation time period to activate said second activating means if said integrated value is equal to or greater than said second threshold value and a third predetermined period of time has lapsed after said first predetermined activation time period has lapsed.

18. A control system for an occupant protection apparatus according to claim 15, wherein said control means energizes said second activation circuit said second predetermined activation time period to activate said second activating means immediately after said first predetermined activation time period has lapsed.

19. A control system for an occupant protection apparatus according to claim 15, wherein said control means energizes said second activation circuit for said second predetermined activation time period to activate said second activating means after said first predetermined activation time period has lapsed and after an additional predetermined period of time has lapsed.

* * * * *